United States Patent

McKellar et al.

[11] 3,874,884
[45] Apr. 1, 1975

[54] COATING COMPOSITIONS

[75] Inventors: John Forgie McKellar; Geoffrey Greenwood Warburton, both of Manchester, England

[73] Assignee: Lamson Industries Limited, London, England

[22] Filed: Oct. 27, 1972

[21] Appl. No.: 301,518

[30] Foreign Application Priority Data
Oct. 27, 1971 United Kingdom.............. 49829/71

[52] U.S. Cl................... 106/14.5, 96/90 R, 106/21, 106/22, 106/288 Q, 106/308 N, 117/35.6, 117/36.8
[51] Int. Cl....... C09k 3/00, C09d 11/00, B41l 7/00, B41l 9/00
[58] Field of Search .... 106/288 Q, 308 N, 21, 14.5, 106/22, 23; 117/35.6, 36.8; 96/90 R

[56] References Cited
UNITED STATES PATENTS

| | | | |
|---|---|---|---|
| 2,727,825 | 12/1955 | Webber................................ | 106/22 |
| 2,755,201 | 7/1956 | Webber et al.................... | 106/22 X |
| 2,981,733 | 4/1961 | Kranz.................................. | 106/22 |
| 2,983,756 | 5/1961 | Kranz.................................. | 106/22 |
| 3,042,515 | 7/1962 | Wainer.............................. | 96/90 R |
| 3,157,677 | 11/1964 | Seibert et al........................... | 106/22 |
| 3,423,427 | 1/1969 | Cescon et al...................... | 106/14.5 |
| 3,467,658 | 9/1969 | Lipka................................. | 106/22 |

FOREIGN PATENTS OR APPLICATIONS

| | | | |
|---|---|---|---|
| 1,352,316 | 5/1974 | United Kingdom.............. | 106/14.5 |

*Primary Examiner*—Joseph L. Schofer
*Assistant Examiner*—T. S. Gron
*Attorney, Agent, or Firm*—Cushman, Darby & Cushman

[57] ABSTRACT

A coating composition suitable for use in the manufacture of a clean-to-handle carbon paper, said composition containing a colour former of the formula:

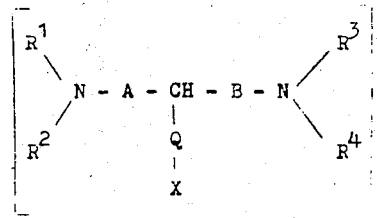

wherein A and B each independently represents an optionally substituted 1,4-arylene residue; each of $R^1$, $R^2$, $R^3$ and $R^4$ independently represents hydrogen or an optionally substitued alkyl, aralkyl, cycloalkyl or aryl radical or forms part of a divalent organic chain which together with the attached nitrogen atom constitutes a heterocyclic ring; Q represents —O— or —NR— in which R denotes hydrogen, hydroxyl, alkoxy or an optionally substituted amino, alkyl, aralkyl or cycloalkyl radical and X represents hydrogen or an optionally substituted hydrocarbon radical which may contain one or more hetero atoms, or R and X together with the attached nitrogen atom form an optionally substituted heterocyclic ring, and an aliphatic amine or an imine.

12 Claims, No Drawings

COATING COMPOSITIONS

This invention relates to coating compositions suitable for use in the manufacture of clean-to-handle carbon papers.

Carbon papers of the clean-to-handle type for use in the spirit-reproducing copying process consisting of tissue or other suitable film or sheet material on which is a coating containing a colourless derivative of a basic dyestuff have already been proposed. In the copying process the carbon paper is placed with its coated surface against one surface of the master paper, the other side of which is then typed, written or marked on causing transfer of the coating as a substantially colourless reverse image to the first-mentioned surface of the master paper at the points where carbon and master papers have been pressed together. The master paper is then brought into contact with a succession of sheets of paper moistened with a suitable spirit-reproducing fluid such as ethanol. The fluid dissolves a part of the basic dyestuff derivative and transfers it to each paper sheet where it combines with an activating substance such as an acid to give a visible colour which will reproduce the original typing or writing on the master paper.

In our co-pending British Application No. 10683/70, clean-to-handle carbon papers have been proposed which have a coating containing a colourless leucauramine compound. From these carbon papers, master copy sheets may be obtained which, when brought into contact with suitable copy paper, provide a plurality of copies on which the original writing is reproduced as a blue colour. In some cases, however, the coated papers, and the coating compositions used in their preparation, show a tendency to discolour, especially under the influence of light. It has now been found that this tendency may be reduced by using coating compositions which contain an aliphatic amine or an imine.

Thus, according to the present invention, there is provided a coating composition suitable for use in the manufacture of a clean-to-handle carbon paper, said composition containing a colour former of the formula:

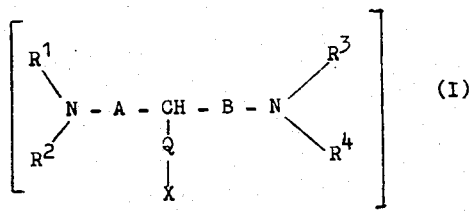

wherein A and B each independently represents an optionally substituted 1,4-arylene residue; each of $R^1$, $R^2$, $R^3$ and $R^4$ independently represents hydrogen or an optionally substituted alkyl, aralkyl, cycloalkyl or aryl radical or forms part of a divalent organic chain which together with the attached nitrogen atom constitutes a heterocyclic ring; Q represents —O— or —NR— in which R denotes hydrogen, hydroxyl, alkoxy or an optionally substituted amino, alkyl, aralkyl or cycloalkyl radical and X represents hydrogen or an optionally substituted hydrocarbon radical which may contain one or more thereto atoms, or R and X together with the attached nitrogen atom form an optionally substituted heterocyclic ring, and an aliphatic amine or an imine.

Examples of 1,4-arylene residues which may be represented by A and B include particularly 1,4-phenylene but also 1,4-naphthylene residues. As examples of substituents which may be present on said arylene residues there may be mentioned halogen atoms and optionally substituted alkyl or alkoxy groups. Other substituents which may be present on the arylene residues include bridging groups such that the compound of Formula I has the structure:

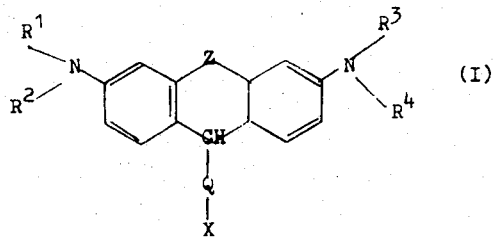

wherein $R^1$, $R^2$, $R^3$, $R^4$, Q and X have the meanings already stated and Z represents a direct link or a divalent atom or group such as oxygen, sulphur or isopropylidene. It is preferred, however, that no substituents are present on A or B and when substituents are present it is preferred that they are alkyl radicals.

Hydrocarbon radicals which may be represented by X include aryl, for example phenyl and naphthyl, alkyl, for example methyl and ethyl, and various alkyl aryl combinations for example benzyl. Hydrocarbon radicals containing hetero atoms include pyridyl and quinolyl. A is preferably aryl.

As examples of optionally substituted alkyl radicals which may be represented by R, $R^1$, $R^2$, $R^3$ and $R^4$ there may be mentioned optionally substituted lower alkyl radicals, for example ethyl, propyl, butyl β-hydroxyethyl, β-chloroethyl, β-pyridin-1-ylethyl and, particularly, methyl.

As examples of optionally substituted aralkyl radicals which may be represented by R, $R^1$, $R^2$, $R^3$ and $R^4$ there may be mentioned 4-methoxybenzyl, 2-methylbenzyl and, particularly, benzyl.

As examples of optionally substituted cycloalkyl radicals which may be represented by R, $R^1$, $R^2$, $R^3$ and $R^4$ there may be mentioned 2-methylcyclohexyl, 4-methylcyclohexyl, cyclopentyl and, particularly, cyclohexyl.

As examples of optionally substituted aryl radicals which may be represented by $R^1$, $R^2$, $R^3$ and $R^4$ there may be mentioned 2-methylphenyl, 4-methylphenyl, 3-chlorophenyl, naphth-2-yl and, particularly, phenyl.

As examples of optionally substituted amino groups which may be represented by R there may be mentioned dialkylamino groups such as dimethylamino and diethylamino, and as examples of alkoxy groups there may be mentioned methoxy and ethoxy.

When either of $R^1$ and $R^2$ form part of a divalent organic chain which together with the attached nitrogen atom constitutes a heterocyclic ring, this may be because $R^1$ and $R^2$ are joined together or because at least one of $R^1$ and $R^2$ is attached to arylene residue A. The radicals $R^3$ and $R^4$ may in the same way form parts of heterocyclic rings.

As examples of heterocyclic rings which may be formed by $R^1$ and $R^2$ or $R^3$ and $R^4$ being joined together there may be mentioned 5- or 6-membered rings such as piperidine, N-methylpiperazine and morpholine rings. As examples of heterocyclic rings which may be formed by $R^1$ and/or $R^2$ being attached to arylene residue A, or by $R^3$ and/or $R^4$ being attached to adjacent arylene residues, there may be mentioned julolidine-8-yl, N-methyl-tetrahydroquinolin-6-yl and 1,2-dimethylindolin-5-yl.

Preferably, R is a hydrogen atom or an alkyl radical or, together with X and the attached nitrogen atom forms a heterocyclic ring. As examples of heterocyclic rings which may be represented by R and X together with the nitrogen atom there may be mentioned 5- or 6-membered rings such as pyrrolidine, piperidine and morpholine.

Preferably $R^1$, $R^2$, $R^3$ and $R^4$ are optionally substituted alkyl radicals, particularly unsubstituted alkyl radicals such as methyl or ethyl, or in appropriate pairs, for example $R^1$ and $R^2$ together, they form divalent organic chains, preferably hydrocarbon chains.

In addition to the substituents already mentioned, the compounds of Formula I may contain one or more substituents capable of allowing the compounds to exist in ionic form.

Thus, particularly useful compounds have the general formula:

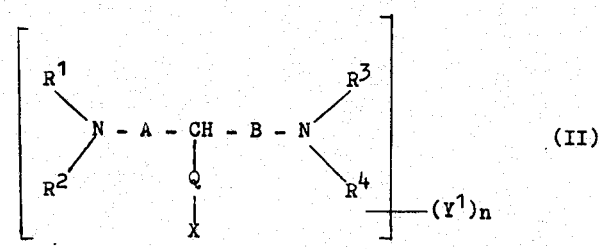

wherein A, B, $R^1$, $R^2$, $R^3$, $R^4$, Q and X have the meanings already stated, $Y^1$ represents a group capable of allowing the compound to exist in anionic form and $n$ has a value of 1, 2 or 3.

Examples of groups of the formula $Y^1$ include sulpho, sulphino, sulphato, sulphito, thiosulphato, thiosulphono, thiosulphino, carboxy, thiocarboxy, radicals of the formula —D—E wherein D represents oxygen, sulphur or a direct link and E represents a radical of the formula:

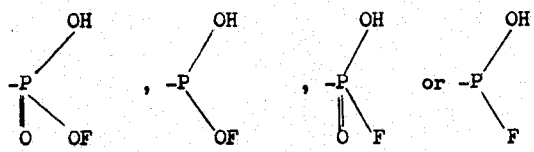

in which F represents hydrogen or a hydrocarbon radical, and corresponding radicals in which one or more of the oxygen atoms may be replaced by sulphur and, provided $Y^1$ is attached to a carbon atom which forms part of an aromatic carbocyclic or heterocyclic system, hydroxy and mercapto groups.

Each of the substituents represented by $Y^1$ may be attached to ring A or B or to any of the radicals represented by R, $R^1$, $R^2$, $R^3$, and $R^4$ but is preferably attached to X. Where more than one $Y^1$ substituent is present in the compound, the said substituents may be the same or different. For example, in a compound containing two $Y^1$ substituents, these may both be sulpho radicals or one may be a sulpho radical and the other a hydroxy radical. Preferably, $n$ is 1.

The coating compositions of the invention are particularly effective when they contain a compound of Formula III in the form of a Group IA metal, Group IIA metal, optionally substituted ammonium, optionally substituted hydrazine, optionally substituted hydroxylamine, optionally substituted guanidine or heterocyclic base salt. In the salt, the amount of the aforesaid metals and nitrogenous bases is equivalent to at least one of the $Y^1$ substituents. Particularly useful Group IA metals include sodium, potassium and tithium. Particularly useful Group IIA metals are magnesium and calcium. The substituted ammonium salts may be primary, secondary or tertiary amine salts or quaternary ammonium salts.

Other useful compounds of the invention have the general formula:

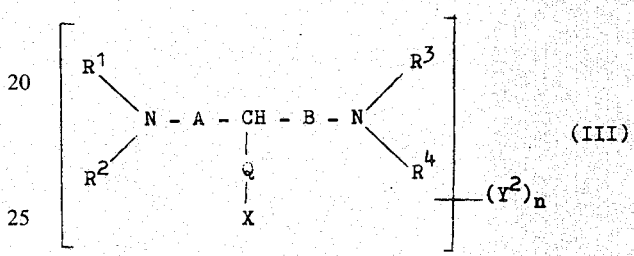

wherein A, B, $R^1$, $R^2$, $R^3$, $R^4$, Q and $n$ have the meanings already stated and $Y^2$ represents a group capable of allowing the compound to exist in cationic form.

Examples of groups of the formula $Y^2$ include groups of the formulae — $^+NR^5R^6R^7$, = $^+NR^5R^6$, ≡ $^+NR^5$, — $^+SR^5R^6$ and = $^+SR^5$ wherein each of $R^5$, $R^6$ and $R^7$ independently represents an optionally substituted alkyl, aralkyl or cycloalkyl residue or forms part of a heterocyclic ring containing the attached nitrogen or sulphur atom, the said groups being associated with an appropriate number of anions to give electrical neutrality.

As examples of optionally substituted alkyl radicals which may be represented by $R^5$, $R^6$ and $R^7$ there may be mentioned optionally substituted lower alkyl radicals, for example, ethyl, propyl, butyl, β-hydroxyethyl, β-chloroethyl and, particularly, methyl.

As examples of optionally substituted cycloalkyl radicals which may be represented by $R^5$, $R^6$, and $R^7$ there may be mentioned 2-methylcyclohexyl, 4-methylcyclohexyl, cyclopentyl and, particularly, cyclohexyl.

As examples of optionally substituted aralkyl radicals which may be represented by $R^5$, $R^6$ and $R^7$ there may be mentioned 4-methoxybenzyl, 2-methylbenzyl and, particularly, benzyl.

When any of $R^5$, $R^6$ and $R^7$ forms part of a heterocyclic ring containing the attached nitrogen atom this may be because at least two $R^5$, $R^6$ and $R^7$ are joined or fused together to form with the nitrogen atom a heterocyclic ring or rings, wherein the nitrogen atom is linked to carbon atoms present in the said heterocyclic ring or rings through either single bonds or through a single bond and a double bond or because one or two of the substituents $R^5$, $R^6$ and $R^7$ are attached to a hydrocarbon residue to which the nitrogen atom is also attached.

As examples of the heterocyclic rings formed by joining together at least two of the groups represented by $R^5$, $R^6$ and $R^7$ and the nitrogen atom so that the nitrogen atom is joined to carbon atoms of the heterocyclic rings through single bonds there may be mentioned pyrrolidine, pyrroline, piperidine, morpholine, piperazine, and pyrrole rings and also rings in which $R^5$, $R^6$ and $R^7$ are joined together to form with the nitrogen atom a polycyclic heterocyclic ring structure in which the nitrogen atom is common to at least 2 of the rings present in the heterocyclic ring structure. As examples of such polycyclic ring structures there may be mentioned pyrrolizidine, 1-azabicyclo-(2.2.1)-heptane, quinuclidine, 1-azabicyclo-(3.2.1)-octane, 1-azabicyclo-(3.2.2)-nonane, 1-isogranatanine, conidine, 1,5-diazabicyclo-(3.3.1)-nonane, 3,7-diazabicyclo-(3.3.1)-nonane, julolidine, hexahydrojulolidine, lilolidine and the 1,4-diazabicyclo-(2.2.2)-octane ring structure.

As examples of the heterocyclic rings formed by joining or fusing together at least two of $R^5$, $R^6$ and $R^7$ so that the nitrogen atom is joined to carbon atoms of the heterocyclic rings through a single bond and a double bond there may be mentioned unsaturated 6-membered heterocyclic rings which may contain substituents or form part of condensed ring systems. As examples of such heterocyclic rings there may be mentioned isoquinoline and preferably pyridine rings which may be substituted by, for example, alkyl radicals in particular the methyl radical, or halogen atoms. Suitable anions include chloride, bromide and methosulphate ions.

The compound of Formula I may also be a salt containing a cation derived from a compound of Formula III and an anion derived from a compound of Formula II.

Particularly useful coating compositions are those in which the compound of Formula I is a Group IA metal or optionally substituted ammonium salt of a compound of the formula:

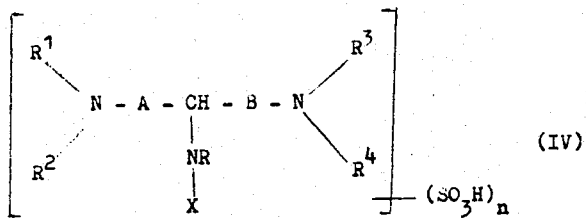

(IV)

wherein A, B, R, $R^1$, $R^2$, $R^3$, $R^4$, X and n have the meanings already stated. The compound of Formula IV is preferably N-(4-sulphophenyl) leucauramine.

The compounds of Formula I may be prepared by reacting a compound having the general formula:

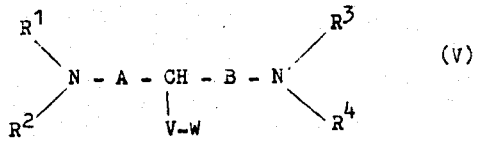

(V)

wherein A, B, $R^1$, $R^2$, $R^3$ and $R^4$ have the meanings already stated, V represents sulphur or, preferably, oxygen and W represents alkyl or, preferably, hydrogen with a compound of the formula:

$$X — QH$$

(VI)

wherein X and Q have the meanings already stated. Reaction between the two compounds is conveniently carried out in a solvent such as water, alcohols or toluene at temperatures of from 0°C to 150°C preferably from 20°C to 100°C.

The compounds of Formula I may also be prepared by reducing a compound of the formula:

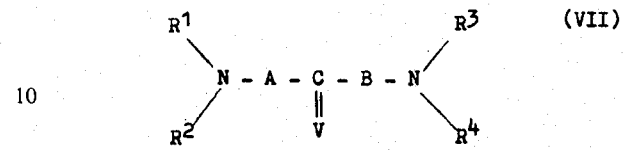

(VII)

wherein A, B, $R^1$, $R^2$, $R^3$, $R^4$ and V have the meanings already stated using neutral or alkaline conditions and reacting the product, without isolation, with a compound of Formula VI.

The compounds of Formula I in which R is hydrogen may also be prepared by reducing an auramine derivative of the formula:

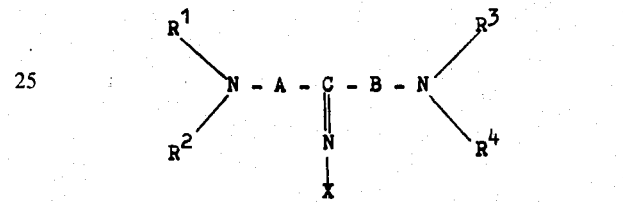

wherein A, B, $R^1$, $R^2$, $R^3$, $R^4$ and X have the meanings already stated, using neutral or alkaline conditions.

The aliphatic amines which may be present in the coating compositions of the invention are primary, secondary or tertiary amines in which the amino groups are attached to aliphatic (i.e., non-aromatic) carbon atoms. Examples of suitable amines include n-dodecylamine, hexamethylene diamine and triethanolamine. Examples of suitable imines include guanidines such as N,N'-di-o-tolylguanidine, N,N'-diphenylguanidine and N,N'-di-o-xylylguanidine. The amine or imine is usually present in the coating composition in an amount of from 50% to 0.5% by weight based on the weight of compound of Formula I. To some extent, the most suitable amount will depend on the nature of the colour former of Formula I. Thus, if the latter contains free acid groups, the amount of amine or imine must be such that there is free amine or imine in the coating composition.

The coating compositions may conveniently be prepared by conventional means, for example by working the ingredients at a suitable temperature in a mill or other mixing machine such as a triple-roll mill, ball mill, or attritor mill.

In addition to the materials already mentioned, the coating compositions may contain organic solvents, cationic surface active agents, a wax such as carnauba wax, Ouricuri wax, Sugarcane wax, Beeswax, chinese insect wax, and candelilla wax, ozokerite wax and crude montan wax, or mixtures of the above waxes, petroleum jelly such as vaseline, polymeric materials such as copolymers of polyvinyl acetate and polyvinyl chloride, polystyrene, ethyl cellulose and cellulose acetate, alkyd and polyamide resins, mineral oils, lanoline, tallow and animal and vegetable oils, neatsfoot oil and blown castor oil.

The coating composition of the invention may be used in the production of clean-to-handle carbon papers for use in the so-called hectographic or spirit-reproducing process.

Thus, according to a further embodiment of the present invention there is provided a carbon paper, for use in the preparation of a master copy to be used in a spirit-reproducing process, which comprises a support material carrying a substantially colourless coating transferable to a master copy sheet by the act of pressing the master sheet against the carbon paper, said coating containing a compound of Formula I and an aliphatic amine or an imine.

The coating composition may be applied to the support material as a hot melt of the components or preferably from a solvent system in which the constituents are dissolved or dispersed in a solvent such as an aromatic hydrocarbon, for example toluene, a ketone, alcohol, ester, ether or chlorinated hydrocarbon or mixture of such solvents. The compound of Formula I is preferably dispersed in the coating composition rather than being dissolved or melted into it.

The coating composition may be applied to the support material by any suitable means, for example by means of rollers or doctor blades and the like to give a coating weight of between 8–50 g. per sq. metre and preferably between 15–25 g. per sq. m. Where the support material is paper, it should be treated with a suitable barrier coating before the coating containing the compound of Formula I is applied. A suitable barrier coating comprises ethyl cellulose or a copolymer of polyvinyl chloride and polyvinyl acetate. A barrier coating weight of about 6 g. per sq. m. is suitable.

The amount of the compound of Formula I present in the coating may be from 15 to 80%, preferably from 45 to 55% based on the total coating weight.

Suitable support materials include paper, glassine, plastics films and the like. Suitable papers include the so-called unbleached all-wood tissues. Suitable plastics films include polypropylene film and especially polyester film such as polyethylene terephthalate film.

The carbon paper thus obtained is essentially colourless but its appearance may be enhanced by the addition of a small amount of titanium dioxide.

When the coated surface of the carbon paper of the invention is placed in contact with one surface of a master copy sheet and the other surface of the master copy sheet is typed or written on or marked in some other way, a substantially colourless reverse image is produced on the first-mentioned surface of said master copy sheet, which surface may then be brought into contact successively with a plurality of sheets of copy paper moistened with a copying fluid in the presence of an electron-accepting substance so as to give a visible reproduction of each of the copy sheets of the original typing, writing or marking on the master copy sheet. A conventional duplicating machine may be used.

A suitable copying fluid for use with the carbon papers of the present invention comprises industrial ethanol (64°OP methylated spirits) in combination with 0–70%, preferably 0–20%, by weight of water. It is desirable that a higher boiling polar solvent such as benzyl alcohol or ethylene glycol is also present, since otherwise the first copies show only a weak image.

The electron-accepting substance may be present in the copying fluid or on the copy paper. Thus, the copying fluid may contain an organic acid, for example tannic, tartaric, salicylic, anthranilic or benzoic acid or an inorganic acid, for example hydrochloric acid. In order to reduce corrosion in the duplicating machinery, it is preferred to have the electron-accepting substance on the copy paper. Where the electron-accepting substance is present on the copy paper it may be a so-called acid mineral such as attapulgite, kaolin, pyrophyllite, talc, bentonite, halloysite, calcium sulphate, calcium citrate, magnesium trisilicate, calcium phosphate or barium sulphate, or an acid treated coating such as that obtained with coating compositions containing acids such as tannic, oleic, gallic, lauric, phosphotungstic and phosphomolybdic acids possibly in conjunction with precipitated calcium carbonate or blanc fixe on the paper.

Runs of up to 100 copies may be obtained from a single master copy using the carbon papers of the present invention.

The invention is illustrated but not limited by the following Examples in which all parts and percentages are by weight.

EXAMPLE 1

A coating composition containing the following ingredients is prepared:

| | |
|---|---|
| N-(4-sulphophenyl) leucauramine, sodium salt | 10 parts |
| Dodecyl benzyl dimethylammonium chloride | 2 parts |
| Castor oil | 4 parts |
| Titanium dioxide | 2 parts |
| Ethyl cellulose (Hercules N 10 grade) | 1 part |
| Silica | 1 part |
| Toluene | 25 parts |

Similar compositions are prepared containing 1% (based on the total composition) of an amine. The compositions are applied as a coating to glassine paper and the papers are exposed to daylight. The effects produced are given in the following table:

| Amine | Before | After daylight exposure of | | |
|---|---|---|---|---|
| | | 1 hr. | 3 hr. | 5 hr. |
| (1) None | Grey | pale-brown | Brown | Deep-brown |
| (2) n-dodecylamine | Grey | Grey | Yellow-grey | Orange-grey |
| (3) hexamethylene-diamine | Grey | Grey | Grey | Grey |
| (4) N,N-diethylethylene diamine | Grey | Grey | Grey | Grey |
| (5) N-isopropyltrimethylene diamine | Grey | Grey | Grey | Grey |

EXAMPLE 2

A coating composition is prepared as described in Example 1. A second composition containing 5% of hexamethylene diamine is prepared. The compositions are coated on to polyester film which is then exposed to daylight. The following colour changes are noted.

| Amine | Before | After daylight exposure of 3½ hr. |
|---|---|---|
| (1) None | Grey | Brown |
| (2) hexamethylene diamine | Grey | Grey |

EXAMPLE 3

A coating composition is prepared as described in Example 1. A second composition containing 1% of 1,2-diaminopropane is prepared. The compositions are coated on to paper card which is then exposed to daylight. The following colour changes are noted.

| Amine | Before | After daylight exposure of | |
|---|---|---|---|
| | | 2 hr. | 4 hr. |
| (1) None | Grey | Brown | Brown |
| (2) 1,2-diaminopropane | Grey | Grey | Grey |

EXAMPLE 4

A coating composition is prepared as described in Example 1 is prepared except that the sodium 4-sulphophenyl leucauramine is replaced by N-[4,4'-bis(dimethylamino) benzhydryl] morpholine. Other compositions containing 1% of various amines are prepared. The compositions are coated on to paper card which is exposed to daylight with the following results:

| Amine | Before | After daylight exposure of 7 hrs. |
|---|---|---|
| (1) None | Grey | Pale-brown |
| (2) n-dodecylamine | Grey | Grey |
| (3) hexamethylene diamine | Grey | Grey |
| (4) N,N-diethyl-ethylene diamine | Grey | Grey |
| (5) N-isopropyltrimethylene diamine | Grey | Grey |
| (6) Hexamethylene-tetramine (2%) | Grey | Buff |

EXAMPLE 5

A coating composition as described in Example 4 is prepared. A second composition containing 1% of hexamethylene diamine is prepared. The compositions are coated on to glassine paper which is then exposed to daylight. The following colour changes are noted:

| Amine | Before | After daylight exposure of 7 hrs. |
|---|---|---|
| (1) None | Grey | Pale-brown |
| (2) hexamethylene-diamine | Grey | Grey |

EXAMPLE 6

A coating composition as described in Example 4 is prepared. Other compositions containing 1% of various additives are prepared. The compositions are coated on to paper card which is exposed to daylight with the following results:

| Additive | Before | After light exposure of | | |
|---|---|---|---|---|
| | | 2 hrs. | 4 hrs. | 6 hrs. |
| None | buff | pale brown | brown | brown |
| Mono ethyl guanidine (free base) | grey | grey | grey | grey |
| Diphenyl guanidine | grey | grey | grey | grey |
| N,N'-diortho tolyl guanidine | grey | grey | grey | grey |
| N,N'-dicyclohexyl guanidine | grey | grey | grey | grey |
| Phenyl diguanide | grey | grey | grey | grey |
| o-chloro phenyl diguanide | grey | grey | grey | grey |
| o-tolyl diguanide | grey | grey | grey | grey |
| $N^1,N^5$-diphenyl diguanide | grey | grey | grey | grey |
| 4-amino-2-amino diphenyl methane | grey | grey | grey | grey |

EXAMPLE 7

A coating composition as described in Example 1 is prepared except that the sodium 4-sulphophenyl leucauramine is replaced by 4,4'bis(dimethylaminophenyl)-2-methyl ether. The compositions are coated on to paper card which is exposed to daylight with the following results:

| Additive (1%) | Before | After daylight exposure of | | |
|---|---|---|---|---|
| | | 2 hrs. | 4 hrs. | 6 hrs. |
| None | grey | grey-yellow | brown | brown |
| N,N' diortho-tolyl-guanidine | grey | grey-yellow | yellow | yellow |
| Hexamethylene diamine | grey | grey | grey | grey |
| Triethanol-amine | grey | grey-yellow | grey-yellow | grey-yellow |

EXAMPLE 8

A coating composition as described in Example 1 is prepared except that the sodium 4-sulphophenyl leucauramine is replaced by 2 methyl-4 sulphophenyl leucauramine-triethylammonium salt. The compositions are coated on to paper card which is exposed to daylight with the following results:

| Additive (1%) | Before | After daylight exposure of | | |
|---|---|---|---|---|
| | | 2 hrs | 4 hrs | 6 hrs |
| None | yellow-grey | brown | brown | deep-brown |
| N,N'-diortho-tolyl guanidine | grey | yellow-grey | pale brown | brown |
| Triethanol-amine | grey | yellow-grey | pale brown | brown |

EXAMPLE 9

A coating composition as described in Example 1 is prepared and similar compositions containing 1% of various additives. The compositions are coated on to paper card which is then exposed to light. The following colour changes are noted.

| Amine | Before | After daylight exposure of | | |
|---|---|---|---|---|
| | | 1 hr. | 3 hrs. | 5 hrs. |
| None | grey | pale-brown | brown | deep brown |
| Trimethylene-diamine | grey | grey | grey | grey |
| 1,2-diaminopropane | grey | grey | grey | grey |
| n-hexylamine | grey | grey-orange | orange | pale brown |
| decamethylene-diamine | grey | grey | grey | grey |
| dodecamethylene-diamine | grey | grey | grey | grey-yellow |

EXAMPLE 10

A coating composition is prepared as described in Example 1. The compositions are coated on paper card which is then exposed to daylight. The following colour changes were noted:

| Amine (1%) | Before | After daylight exposure of | | |
|---|---|---|---|---|
| | | 2 hrs | 4 hrs | 6 hrs |
| None | Buff | pale-brown | brown | brown |
| N,N dibenzyl methylamine | pale buff | pale buff | buff | pale brown |
| α-methyl benzyl dimethylamine | grey | pale buff | buff | pale brown |
| 1,4-diamino-2,3-diphenyl butane | grey | grey | grey | grey |
| β,γ-diphenyl propylamine | grey | grey | grey | grey |
| 2,2 bis-(amino methyl)propyl benzene | grey | grey | pale buff | pale buff |
| 1,6-bis-(2 cyano-α methyl ethyl amino) hexane | grey | grey | grey | grey |
| Monoethanolamine | grey | grey | grey | grey |
| Diethanolamine | yellow grey | yellow grey | yellow grey | yellow grey |
| Triethanolamine | grey | grey | grey | grey |

What we claim is:

1. A stabilized coating composition suitable for use in the manufacture of a clean-to-handle carbon paper, said composition containing:

a. a colour former of the formula $$R^1\diagdown_{R^2}\diagup N - A - CH(Q)(X) - B - N\diagup^{R^3}\diagdown_{R^4}$$

wherein A and B each independently represents an optionally substituted 1,4-arylene residue; each of $R^1$, $R^2$, $R^3$ and $R^4$ independently represents hydrogen or an optionally substituted alkyl, aralkyl, cycloalkyl or aryl radical or forms part of a divalent organic chain which together with the attached nitrogen atom constitutes a heterocyclic ring; Q represents —O— or —NR— in which R denotes hydrogen, hydroxyl, alkoxy or an optionally substituted amino, alkyl, aralkyl or cycloalkyl radical and X represents hydrogen or an optionally substituted hydrocarbon radical which may contain one or more hetero atoms, or R and X together with the attached nitrogen atom form an optionally substituted heterocyclic ring, and, b. an aliphatic amine or a guanidine as a stabilizer, whereby the stability of the coating composition, and coated papers made therefrom, to discolouration under the influence of light is improved.

2. Composition as claimed in claim 1, wherein the amine or guanidine is selected from the group consisting of n-dodecylamine, hexamethylene diamine, triethanolamine N,N'-di-o-tolylguanidine, N,N'-diphenylguanidine and N,N'-di-o-xylyl-guanidine.

3. Composition as claimed in claim 1, wherein said composition contains from 0.5% to 50% by weight of said amine or guanidine, based on the weight of said colour former.

4. A coating composition as claimed in claim 1 wherein each of $R^1$, $R^2$, $R^3$ and $R^4$ is methyl.

5. A coating composition as claimed in claim 1 wherein the colour former has the formula:

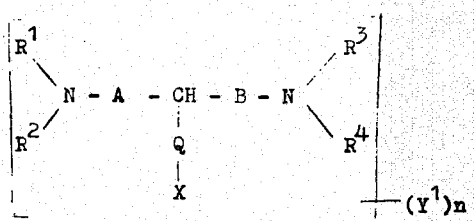

wherein A, B, $R^1$, $R^2$, $R^3$, $R^4$, Q and X have the meanings stated in claim 1, $Y^1$ represents a group capable of allowing the compound to exist in anionic form and n has a value of 1,2 or 3.

6. A coating composition as claimed in claim 5 wherein, in the colour former, each $Y^1$ is a sulpho group.

7. A coating composition as claimed in claim 5 wherein, in the colour former, each $Y^1$ substituent is attached to an optionally substituted hydrocarbon radical represented by X.

8. A coating composition as claimed in claim 5 wherein, in the colour former, $n$ is 1.

9. A coating composition as claimed in claim 5 wherein, in the colour former, each of $R^1$, $R^2$, $R^3$ and $R^4$ is methyl.

10. A coating composition as claimed in claim 5 wherein the colour former is in the form of a Group IA metal, Group IIA metal, optionally substituted ammonium, optionally substituted hydrazine, optionally substituted hydroxylamine, optionally substituted guanidine or heterocyclic base salt.

11. A coating composition as claimed in claim 10 wherein the colour former is a Group IA metal or optionally substituted ammonium salt of N-(4-sulphophenyl) leucauramine.

12. A hectographic carbon paper comprising a support material and an overlying coating of the composition of claim 3.

* * * * *